July 7, 1953 — C. R. LIVERMON — 2,644,176
AMPHIBIOUS BOAT TRAILER
Filed Jan. 27, 1949 — 7 Sheets-Sheet 2
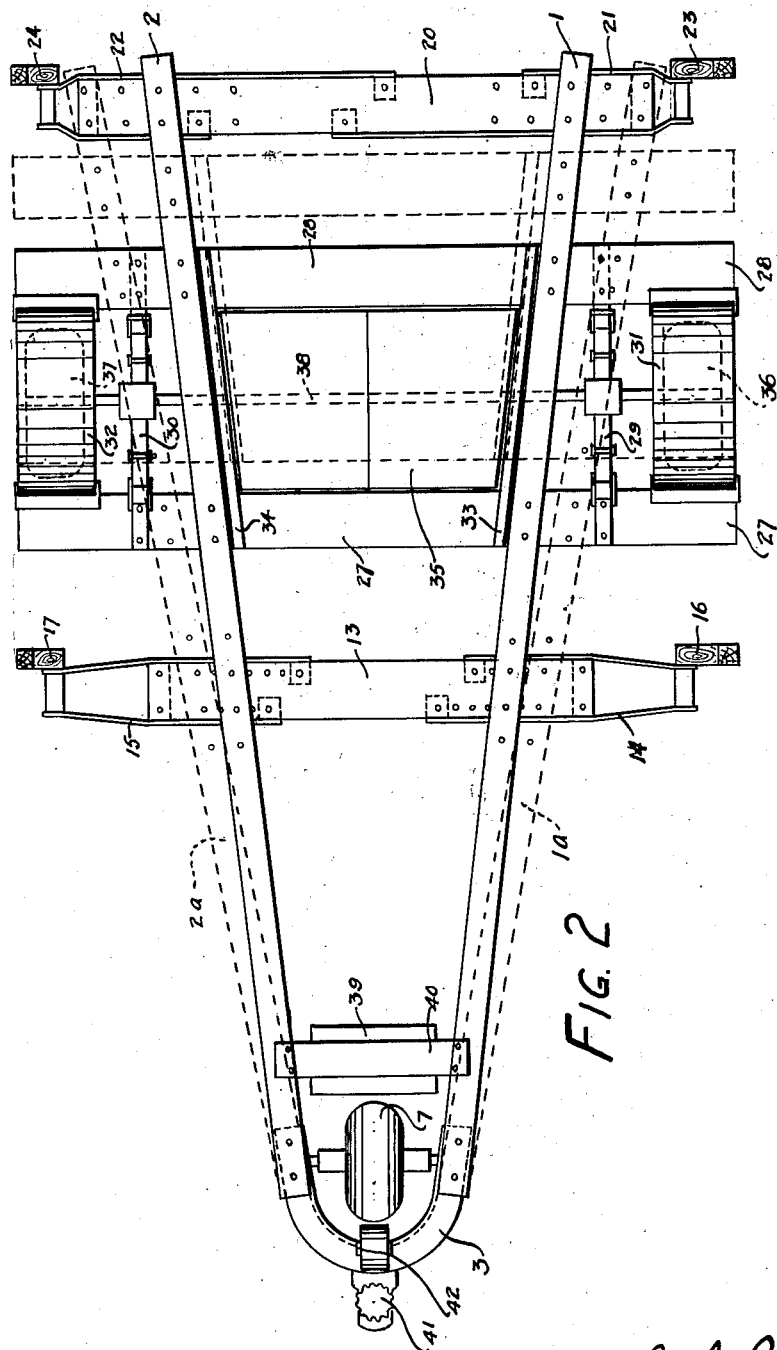
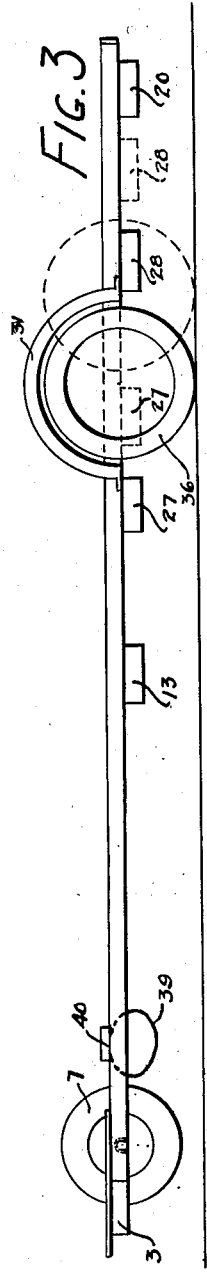
INVENTOR.
Carl R. Livermon
BY Pierce, Scheffler + Parker
his atty's July 7, 1953
C. R. LIVERMON
2,644,176
AMPHIBIOUS BOAT TRAILER
Filed Jan. 27, 1949
7 Sheets-Sheet 3
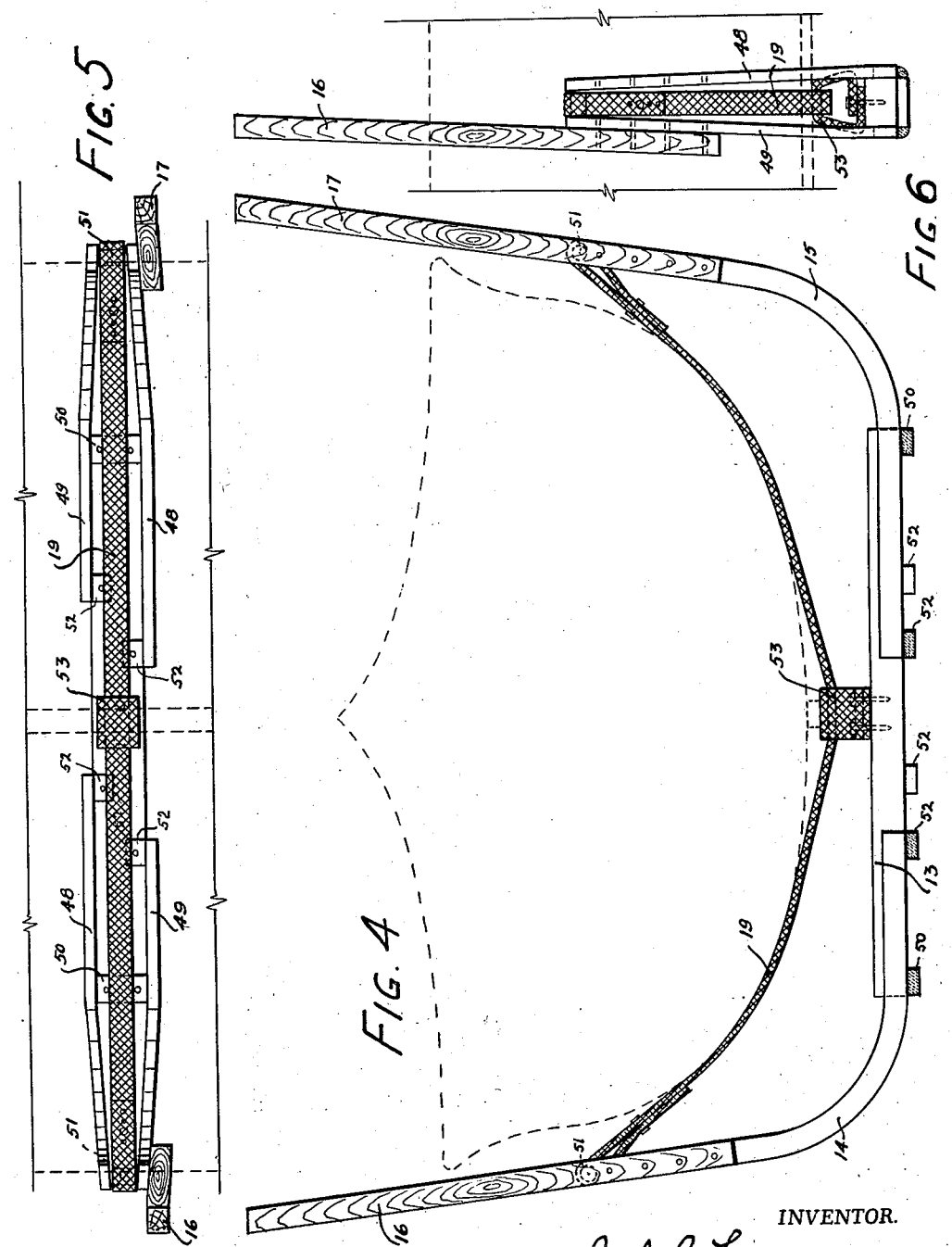
INVENTOR.
Carl R. Livermon
BY
Pierce, Scheffler + Parker
his atty's

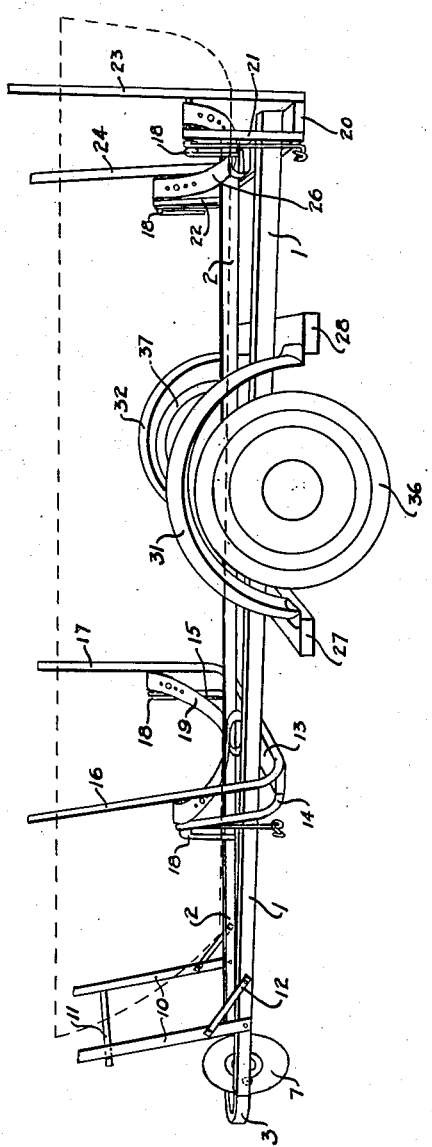

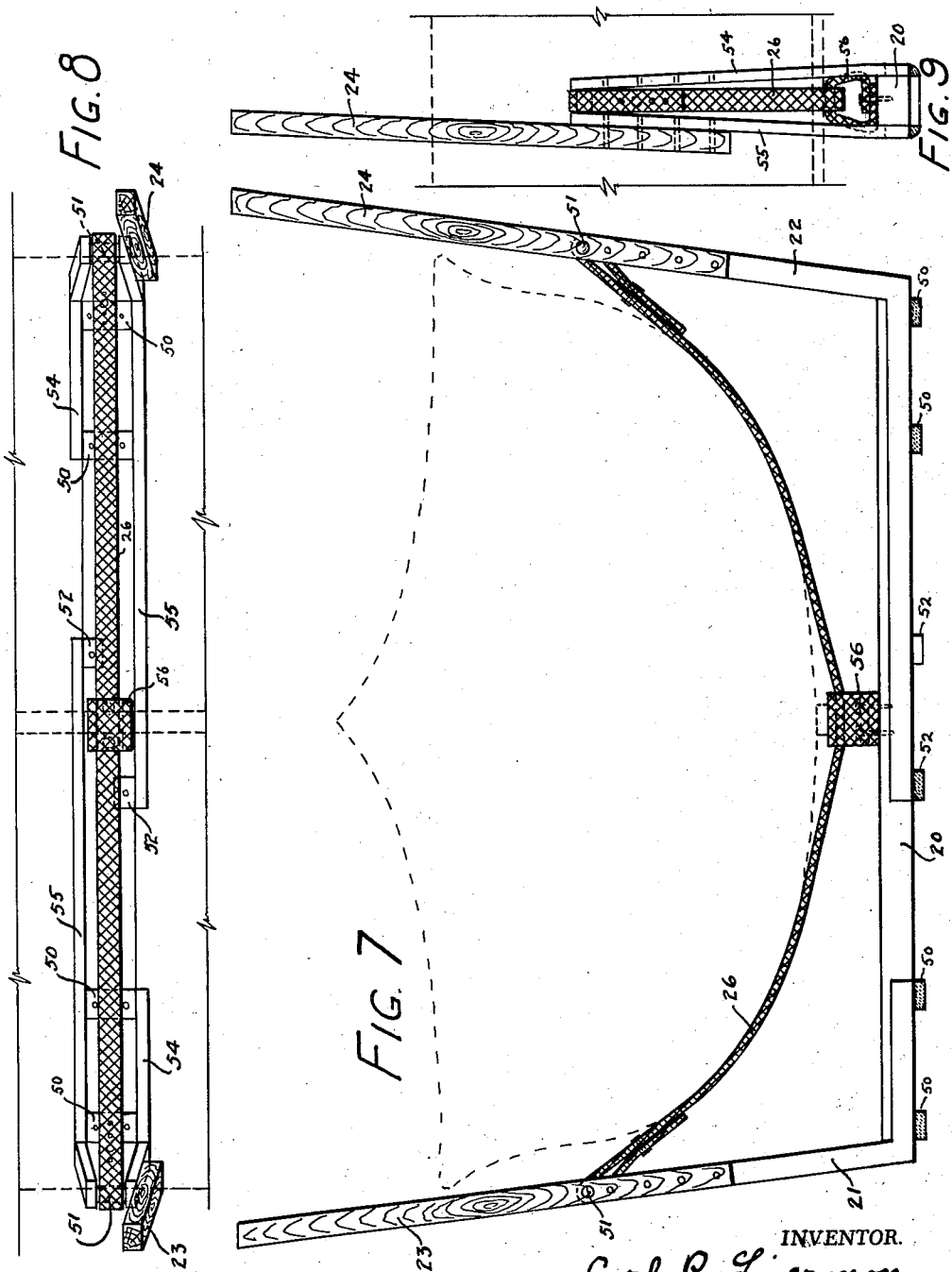

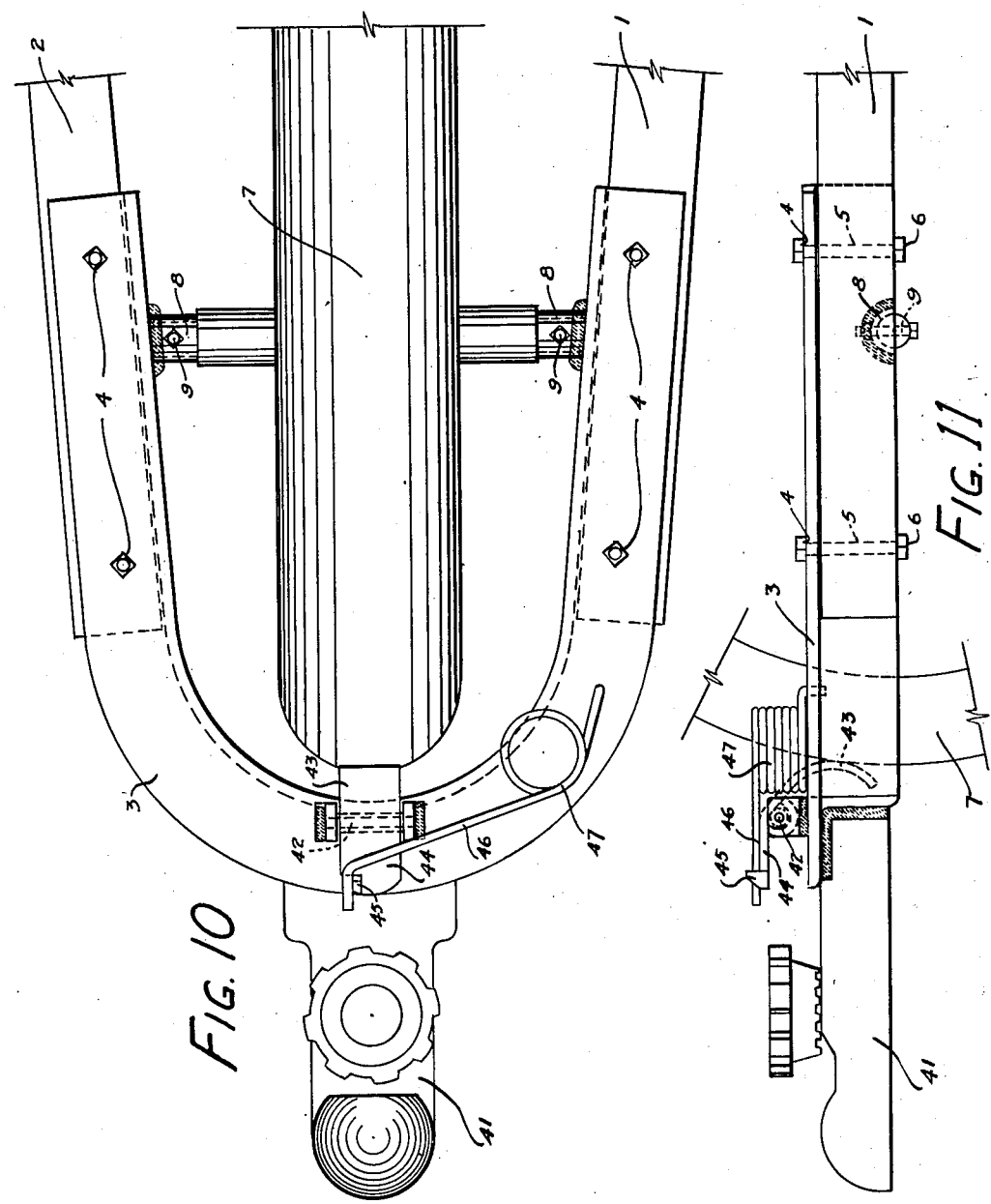

July 7, 1953   C. R. LIVERMON   2,644,176
AMPHIBIOUS BOAT TRAILER
Filed Jan. 27, 1949   7 Sheets-Sheet 6
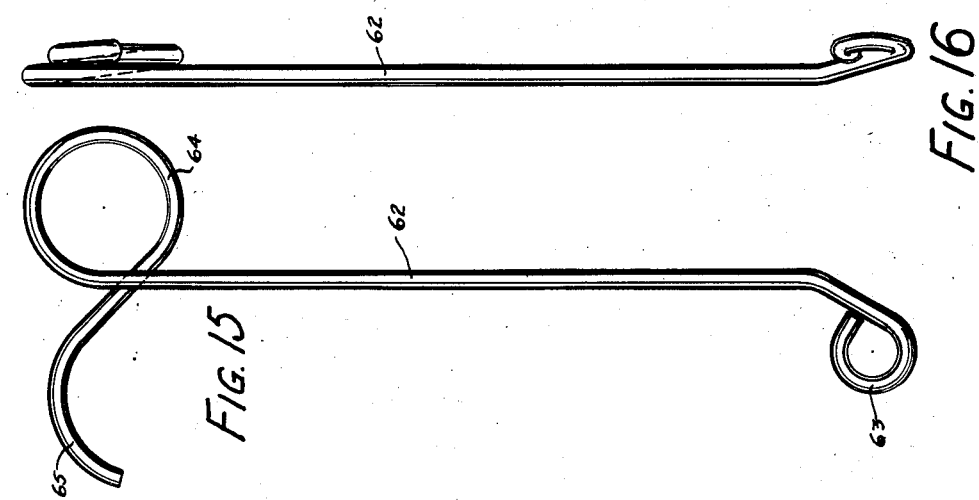
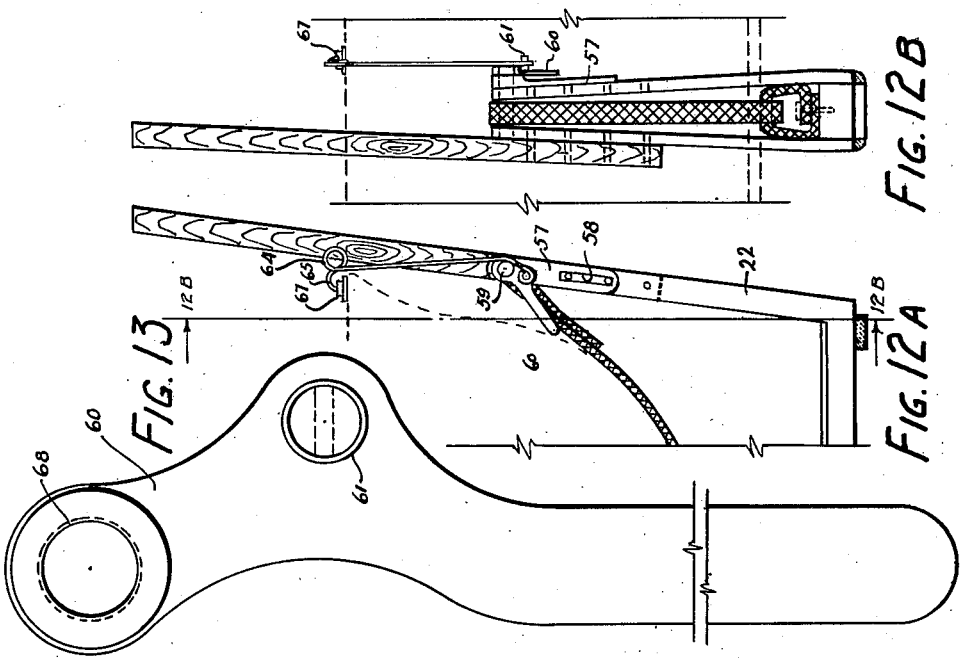
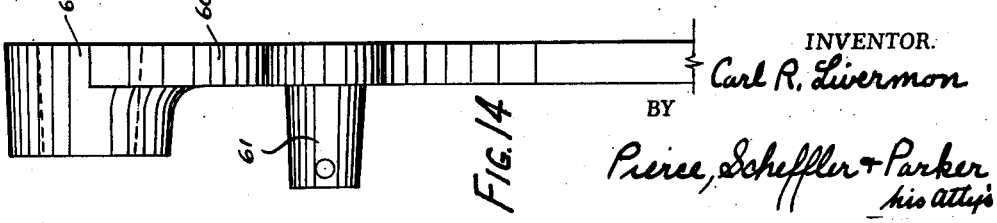
INVENTOR.
Carl R. Livermon
BY
Pierce, Scheffler + Parker
his atty's

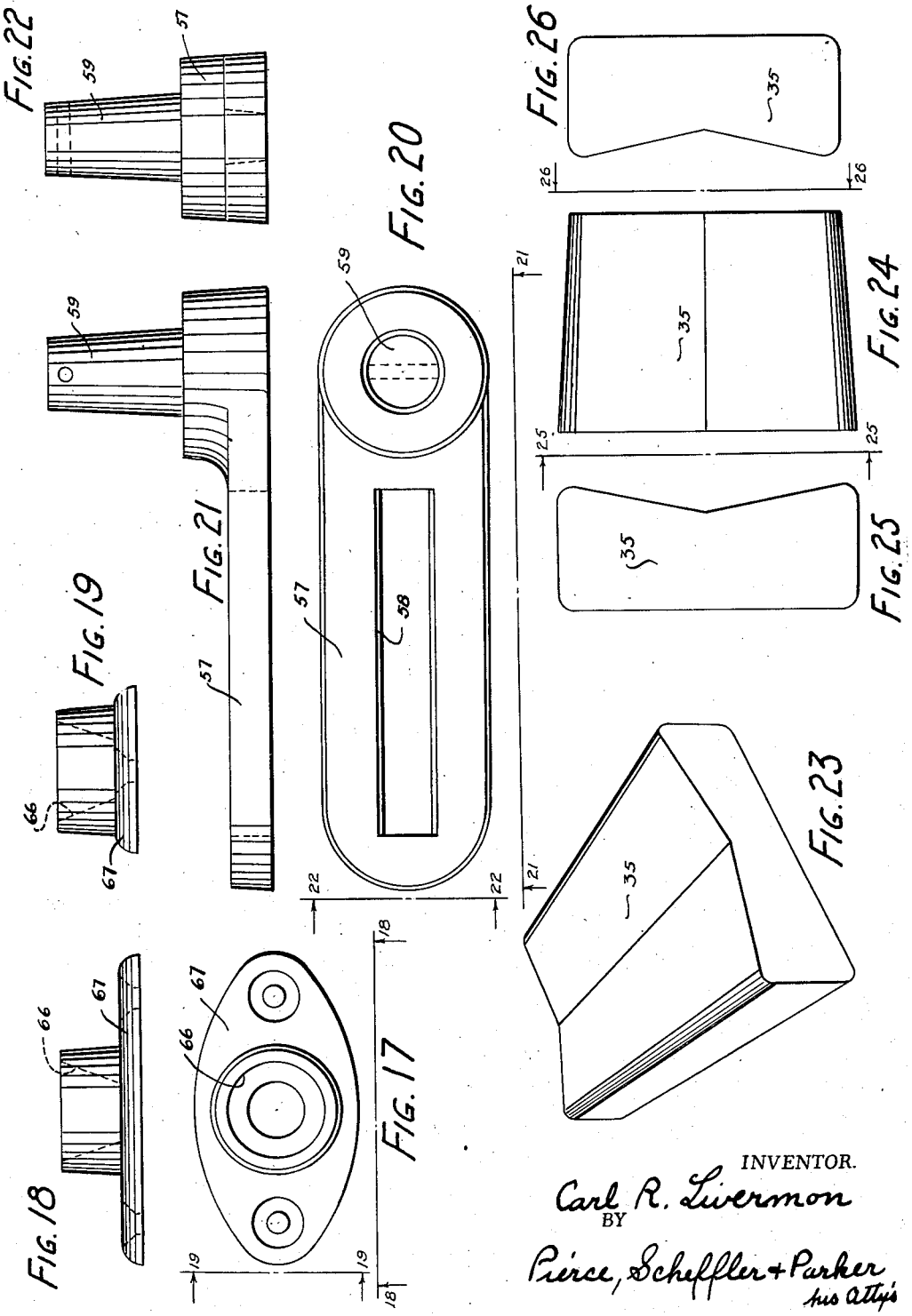

Patented July 7, 1953

2,644,176

UNITED STATES PATENT OFFICE 2,644,176

AMPHIBIOUS BOAT TRAILER

Carl R. Livermon, Roxobel, N. C.

Application January 27, 1949, Serial No. 73,086

3 Claims. (Cl. 9—1)

The present invention relates to an amphibious boat trailer of the type covered by my Patent No. 2,361,951. The present invention relates to certain improvements upon the trailer of said patent as will appear more fully hereinafter.

The principal object of my present invention is to provide a boat trailer which is fully adjustable to accommodate boats of different sizes and shapes and having different distributions of weight.

Another object of my present invention is to dispense with the outboard floats of the trailer of my prior patent and the means for adjusting the level thereof and to substitute therefor inboard floats rigidly positioned within the frame of the trailer where they are protected against damage by contact with external objects.

A further object of my invention is to provide means for flexibly but securely locking the boat in the trailer and thus to reduce the danger of damage to the boat or trailer incident to irregularities in the road over which the trailer travels and rough water.

Still another object of the invention is to provide improved means for securing the boat to the trailer which is adapted to quick and easy operation.

More particularly an object of my invention is to provide flexible adjustable cradles for the boat which will not damage the boat structure or even the finish thereof incident to relative movement of the boat and trailer.

Another object of my present invention is to provide an improved trailer from the standpoint of its manufacture and particularly in the provision of a unitary truck structure which is readily assembled with and adjustable longitudinally of the frame structure.

A further object of my invention is to provide a trailer with a readily detachable front wheel.

A further object of my invention is to provide a trailer with a brake adapted to hold the trailer when it is being moved by hand as when it is being launched.

A further object of my invention is to provide a float shape which contributes to the stability of the trailer when afloat.

Other features of the improved trailer of the present invention will appear in the following detailed description of an embodiment thereof illustrated in the accompanying drawings in which:

Fig. 1 is a perspective side view of the trailer with the outline of the boat shown in dotted line;

Fig. 2 is a top plan view of the trailer with certain parts omitted;

Fig. 3 is a side elevation of the trailer frame and wheels with all other parts omitted;

Figs. 4, 5 and 6 are respectively a front elevation, a plan view and a side elevation of the forward cradle, Figs. 7, 8 and 9 are respectively a front elevation, plan and side elevation of the rear cradle, Fig. 10 is a plan view of the front end of the trailer frame showing the hitch, the brake and the detachable front wheel;

Fig. 11 is a side elevation of the front end of the frame as shown in plan in Fig. 10;

Figs. 12a and 12b are respectively a front elevation and a side elevation of a rear cradle bracket with its associated clamp for securing the boat in the trailer;

Figs. 13 and 14 are respectively a side elevation and an edge elevation of the clamp arm;

Figs. 15 and 16 are respectively side and edge elevations of the clamp spring;

Figs. 17, 18 and 19 are respectively a plan, a side elevation and an end elevation of the clamp socket;

Figs. 20, 21 and 22 are respectively a plan, a side elevation and an end elevation of the stationary part of the clamp; and Figs. 23, 24, 25 and 26 are respectively a perspective view, a top plan view, an elevation of the larger end and an elevation of the smaller end of the float.

Referring to the drawing, particularly Fig. 1, it will be seen that the frame of the trailer comprises the two side beams 1 and 2 the front ends of which are secured to U-shaped member 3. The U-shaped member 3 is formed of angle iron (see Fig. 11) and the side beams 1 and 2 of wood and the front ends of the beams 1 and 2 are secured to the member 3 by means of bolts 6 which pass through openings 4 in the member 3 and openings 5 in the beams 1 and 2. The openings 5 may be made sufficiently larger than the bolts to permit the beams 1 and 2 to be adjusted laterally, for instance to the positions 1a and 2a (Fig. 2).

The axle of the front wheel 7 is demountably secured in the semi-cylindrical saddles 8 by the bolts 9 and elongated or enlarged bolt holes permits the adjustment of the beams 1 and 2.

The front posts 10, 10 are bolted to the side beams 1 and 2 and carry the cross rail 11 and are braced to the side beams by the braces 12, 12. The cross rail 11 of the front standard 10, 10, 11 need not be made adjustable with respect to the posts 10, 10 because movement at this point is small and the posts 10, 10 and their connections to the beams 1 and 2 are sufficiently flexible to take care of it.

Adjacent the front end of the trailer but behind the standard 10, 10, 11 is the front cradle. As will appear from the detailed description hereinafter the front cradle comprises the cross beam 13 which is adjustable longitudinally and transversely with respect to the side beams 1 and 2. The beam 13 carries the laterally adjustable cradle brackets 14 and 15 which carry the guide posts 16 and 17, the clamp mechanism 18, 18 and the flexible and adjustable cradle belt 19.

At the rear end of the frame is the cross beam 20 with respect to which the side beams 1 and 2 are laterally adjustable. The beam 20 constitutes a part of the rear cradle which comprises the laterally adjustable cradle brackets 21 and 22 which carry the guide posts 23 and 24 and the clamp mechanism 18, 18 and the flexible cradle belt 26.

The adjustment of the positions of the front and rear cradles with respect to the beams 1 and 2 is provided for by providing the beams 1, 2, 13 and 20 with rows of holes or elongated holes or slots through which beams 13 and 20 may be secured by bolts to beams 1 and 2 in various adjusted positions.

The truck comprises the transverse beams 27 and 28 which are secured together in parallel relation by the springs 29 and 30, the wheel guards 31 and 32 and the float supporting beams 33 and 34 and includes also the rear float 35, the wheels 36 and 37 and the axle 38. The truck is adjustably mounted under the beams 1 and 2 so as to permit it to be positioned at any desired position longitudinally of the frame so as to balance the frame and the boat carried on it. The truck also permits lateral adjustment of the beams 1 and 2, such adjustments being provided for by providing a plurality of holes in the beams 1, 2, 27 and 28 for the bolts which secure them together.

Since the float 35 is not adjustable as to size and shape it is made of such a size that it will fit between the beams 1 and 2 in their most inwardly adjusted position and when the truck is in its most forwardly adjusted position. The parts of the truck are not adjustable relative to each other.

The front float 39 is mounted adjacent the front wheel 7 on the cross beam 40 which may be made sufficiently adjustable with respect to the side beams 1 and 2 by slight enlargement or elongation of the bolt holes.

The front end of the trailer is provided with a conventional hitch 41 and the brake 42 which will be more fully described below.

In Fig. 2 the truck is shown in full lines in its most forward position, its most rearward position being shown in dotted lines.

Referring to Figs. 10 and 11, the brake is a curved metal plate pivoted at 42 to provide the brake shoe 43 and the handle 44. The brake is so balanced that it normally hangs in inoperative position. For actuating it the handle 44 is provided with the lug or ear 45 which is adapted to be engaged by the free end 46 of the coiled spring 47 to urge the shoe 43 into yielding contact with the wheel 7. Thus when the trailer is being transported the spring arm 46 may be released from the lug 45 permitting the brake to hang inoperative but when the trailer is unhitched and is to be parked or moved by hand down the bank of a body of water the spring arm 46 may be engaged with the lug 45 to actuate the brake. It is noted that the brake is so shaped and positioned with respect to the wheel 7 that in its operative position is merely drags on the front wheel in the forward movement of the trailer but tends to lock when the trailer is moved backward. This feature is very useful when backing the trailer by hand down the bank of a body of water and when removing the trailer from the water because the movement of the trailer backward and downhill may be governed by varying the pressure of the front wheel on the ground, i. e. by lifting more or less or pressing down more or less on the front end of the trailer.

The front and rear cradles are similar. Each comprises a cross beam which is adjustable with respect to the side beams 1 and 2. Each comprises end brackets which are adjustable with respect to the cross beam and the brackets support the standards which engage the sides of the boat, the clamps which hold the boat in the trailer and the flexible cradle belts. Referring to Figs. 4, 5 and 6 of the front cradle the brackets 14 and 15 each consist of two side members 48 and 49 having straight end portions and an intermediate substantially 90° curved portion, the two members 48 and 49 being held in spaced parallel relationship by the transverse connectors 50 and 51. The horizontal straight portions of the side members 48 and 49 are of different lengths so as to limit the portion of the beam 13 left unbraced by said side members when the brackets are adjusted outwardly resulting in a separation of their inner ends. As shown in Fig. 5, the ends 48 do not overlap but it will be apparent that the side members 48 and 49 may be made sufficiently unequal in length, as in the case of the rear cradle, that they will overlap in their extreme outwardly adjusted positions. The beam 13 is provided with lines of holes through which the side members 48 and 49 may be bolted to it through the transverse connectors 50 and the lugs 52. The side member 49 of the left hand bracket carries the standard 16 and the side member 48 of the right hand bracket carries the standard 17. The side member 48 of the left hand bracket and the side member 49 of the right hand bracket carry clamping mechanism 18 which is not shown in Figs. 4, 5 and 6.

Bolted to the cross beam 13, at the center thereof is the flexible, adjustable fabric cradle loop 53. This loop is formed of a strip of fabric with its ends overlapped and secured to the beam 13 and is made adjustable as to the size of the loop by being provided with a row of holes in each end through which the bolts which secure it to the beam 13 pass. The cradle belt 19 is secured at its ends to the transverse connectors 51 and passes through the loop 53 and is made adjustable by having each end provided with a series of holes through which the bolt which secures it to a connector 51 passes.

The rear cradle is similar in every respect to the front cradle excepting that the side members 54 and 55 are sufficiently unequal in length that the ends overlap even in their most outwardly adjusted positions and the straight horizontal and substantially vertical portions join at an angle of nearly 90°, the curved portion of the front cradle brackets being omitted. The cradle loop 56 is adjustable and is secured to the beam 20 in the same way that the loop 53 is secured to the beams 13 and the belt 26 is adjustably supported in the same way as the belt 19. As stated, the brackets 21 and 22 support the side posts 23 and 24 and the clamp mechanism 18.

Referring now to Figs. 12, 12a, 12b, 13, 14, 15, 16, 17, 18, 19, 20, 21 and 22, the clamping mechanism is for convenience shown attached to bracket 22 of the rear cradle, it being understood that the other three clamping mechanisms are similarly mounted on the other three cradle brackets. The clamping mechanism comprises the bracket 57 having the elongated slot 58 by means of which it is vertically adjustably secured to the cradle bracket, and the stud shaft 59 on which the actuating arm 60 of the clamping mechanism is rotatably mounted. The arm 60 carries the stud shaft 61 to which the spring clamp 62 is connected. The clamp 62 comprises the loop 63 at one end for cooperation with the stud shaft 61 and the spring loop 64 and hook 65 at the other end for flexibly engaging the socket 66 in the plate 67 which is secured to the gunwale of the boat. As appears most clearly from Fig. 12a the arm 60 when swung in an arc counterclockwise elevates the stud shaft 61 and the spring clamp 62 and releases the hook 65 from the socket 66 and when swung clockwise to the position shown in Fig. 12a moves past center under tension and locks in said position with the shaft of the spring clamp 62 resting against the stud 59 or the hub 68 of the arm 60.

Referring to Figs. 23-26, inclusive, the main float 35 is generally oblong in shape but is narrower at one end than the other to fit the wedge shaped space between the side beams 1 and 2 and its top wall is a flat V-shape in cross-section to fit the bottom of the boat, the purpose of this shape being to provide the maximum volume or buoyancy available within the space between the side beams 1 and 2 and at the same time to provide a float shape which contributes to the stability of the trailer when it is afloat. It is noted in this connection that the front float is shown as being cylindrical but may be of any other desired shape, e. g. oblong.

The trailer is designed to float in the water with a surplus buoyancy of, say, 20 pounds more or less depending upon the size of the trailer. The pneumatic tires of the wheels 7, 36 and 37 contribute to this buoyancy which is sufficient to keep the trailer positively afloat but is insufficient to materially raise the level of the boat and render the combined boat and trailer unstable. The limited surplus buoyancy of the trailer permits the boat to be easily floated off of and on to the trailer. In providing this surplus buoyancy it will be appreciated that the top portions of the tires extend above the water when the trailer is floating free.

In use the width of the trailer frame and the width of the cradles and their positions longitudinally of the trailer, the size of the loops 53 and 56, and the hang of the belts 19 and 26 are all adjusted to fit the boat to be carried and to substantially balance the boat and trailer on the rear wheels. The boat is then placed on the trailer and the clamp hooks 65 are engaged in the sockets 66 and the arms 60 moved downwardly to lock the boat on the trailer. The spring clamps 62 and the cradle belts 19 and 26 are sufficiently resilient that they permit movement of the boat with respect to the trailer without exerting harmful pressure or becoming unfastened. I have found it to be unnecessary to provide other means for preventing the boat from sliding rearwardly off of the trailer. The front standard 10, 10, 11 serves primarily to position the front end of the boat with respect to the trailer and is not designed to prevent the boat from sliding with respect to the trailer since the clamps adequately serve this purpose. The trailer is then hitched to an automobile and taken to the body of water where the boat is to be used. Here the brake 43, 44 is applied and the trailer unhitched. The trailer is then turned by hand so that the prow of the boat is toward the water and is pushed into the water. The boat and trailer may be moved in the water as by means of oars or an outboard motor to deep water where the trailer is anchored. The clamp hooks 65 are then released and the boat backed off of the trailer leaving the trailer floating but with the frame submerged and only the upper portions of the wheels 36 and 37 and the standards 16, 17, 23 and 24 above water. For the return trip the boat is floated on to the trailer, the clamp hooks 65 applied and tightened, the trailer released from its anchor and the boat and trailer floated to shore where generally it may be drawn up on land by means of the automobile and a tow rope.

It is within the scope of my invention to omit certain of the adjustable features of the trailer construction described above. For instance the lateral adjustability of the side beams 1 and 2 may be omitted. This results in some economy in the construction. Also, the adjustability of the cross beams 13 and 20 with respect to the side beams 1 and 2 may be omitted. It may even be feasible, for instance in providing a trailer for a particular boat, to omit the adjustability of the truck with respect to the side beams 1 and 2 and/or the adjustability of the cradle brackets 14 and 15 and/or the cradle brackets 21 and 22 and/or the cradle belts 18 and 26 and/or the loops 53 and 56.

I claim:

1. An amphibious boat trailer having a pneumatic tired wheel truck, said truck comprising a transverse support and an axle connected to and resiliently supporting said transverse support, said axle supported at its ends by the pneumatic tired wheels, a frame having spaced apart side beams secured to said transverse support, a float fixedly attached to said transverse support between said side beams and overlying said axle and shaped to conform to the space between said side beams and means for detachably securing a boat to said frame.

2. An amphibious boat trailer as defined in claim 1 in which the upper surface of the float is a relatively flat V-shape.

3. An amphibious boat trailer as defined in claim 1 in which the float is mounted on the wheel truck between the side beams adjacent one end thereof and a second float is mounted between said side beams adjacent the other end thereof.

CARL R. LIVERMON.

References Cited in the file of this patent

UNITED STATES PATENTS

| Number | Name | Date |
| --- | --- | --- |
| 801,051 | Smith | Oct. 3, 1905 |
| 1,071,113 | Teters | Aug. 26, 1913 |
| 1,075,074 | Uchtmann | Oct. 7, 1913 |
| 1,302,489 | Hollis | Apr. 29, 1919 |
| 1,531,180 | Erickson | Mar. 24, 1925 |
| 1,636,562 | Hick | July 19, 1927 |
| 1,779,887 | Melanson | Oct. 28, 1930 |
| 1,785,421 | Nielsen | Dec. 16, 1930 |
| 2,260,676 | Lafaye | Oct. 28, 1941 |
| 2,361,951 | Livermon | Nov. 7, 1944 |
| 2,444,690 | Almendinger et al. | July 6, 1948 |
| 2,448,443 | Krake | Aug. 31, 1948 |

FOREIGN PATENTS

| Number | Country | Date |
| --- | --- | --- |
| 10,934 | Great Britain | of 1900 |
| 28,773 | Sweden | Apr. 30, 1910 |
| 354,373 | Germany | June 10, 1922 |